Figure 4:
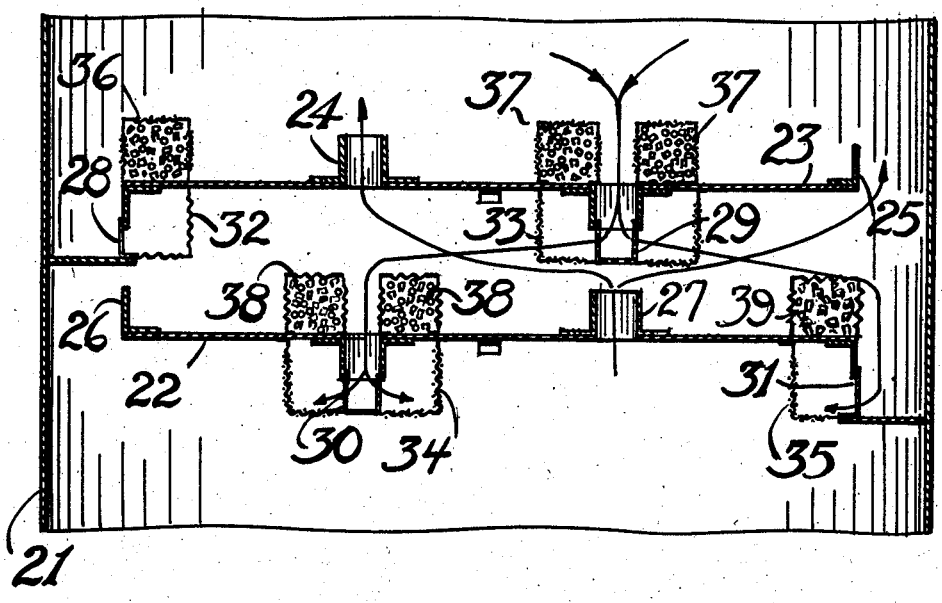

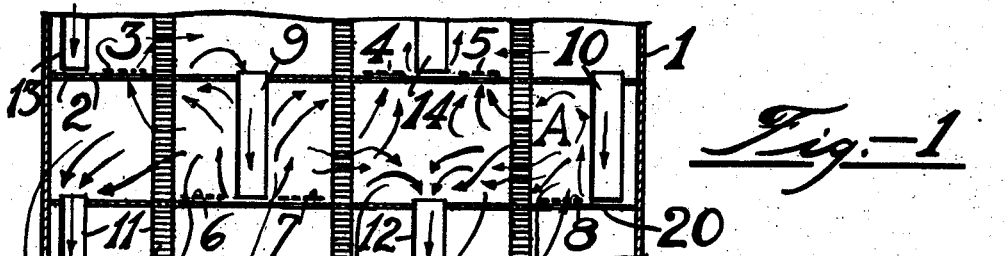
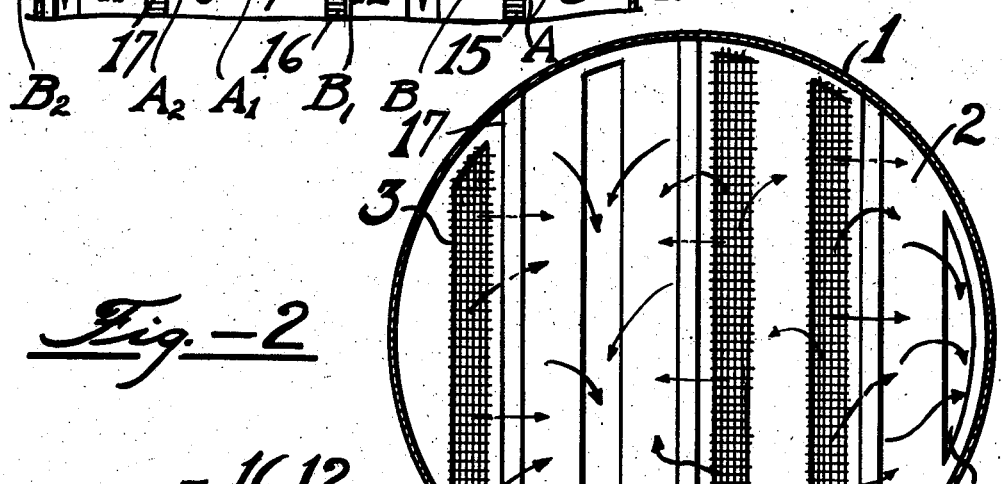
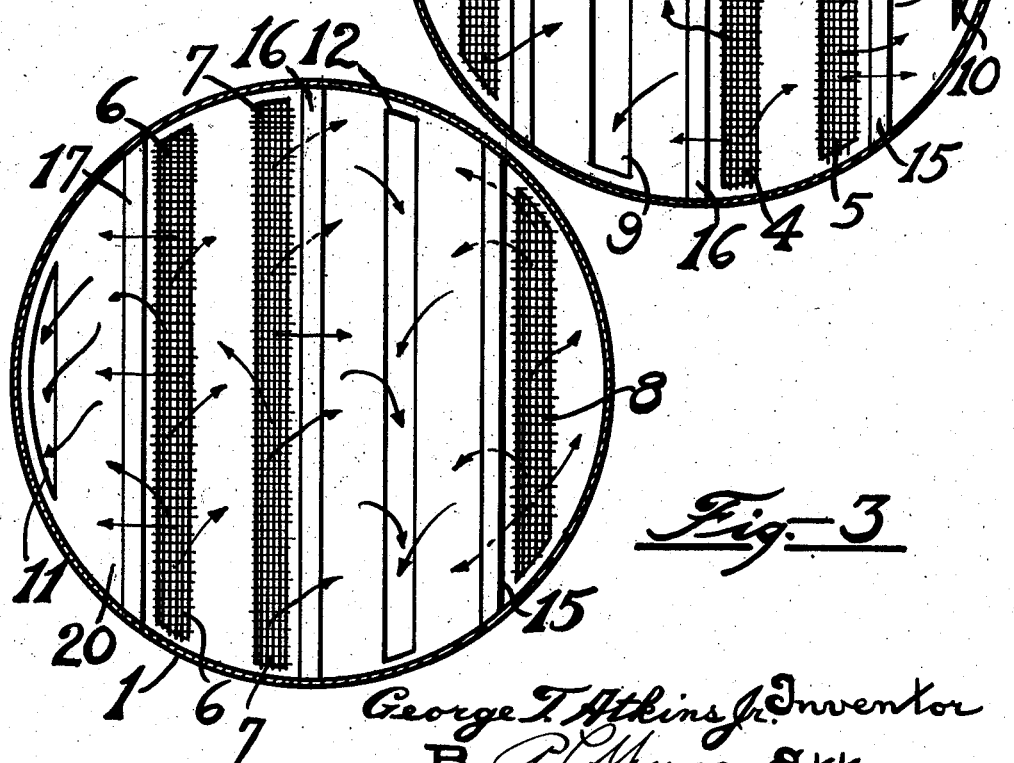

Feb. 24, 1942.  G. T. ATKINS, JR  2,274,030
PROCESS IMPROVEMENT FOR SOLVENT EXTRACTING OPERATIONS
Filed July 29, 1938  2 Sheets—Sheet 2

George T. Atkins Jr. Inventor
By  Attorney

Patented Feb. 24, 1942

2,274,030

UNITED STATES PATENT OFFICE 2,274,030

PROCESS IMPROVEMENT FOR SOLVENT EXTRACTING OPERATIONS

George T. Atkins, Jr., Highlands, Tex., assignor to Standard Oil Development Company, a corporation of Delaware Application July 29, 1938, Serial No. 221,938

4 Claims. (Cl. 196—13)

The present invention relates to the solvent treatment of mineral oils. The invention particularly relates to an improved countercurrent solvent treating process and tower by which it is possible to secure more intimate mixing of the solvent and the mineral oil being treated, thus securing optimum yields and the maximum tower capacity and efficiency. The process of the present invention utilizes in a countercurrent solvent treating tower distributing plates, downflow pipes for the heavier component, upflow screens for the lighter component and horizontal settling surfaces or screens and the like, to provide a settling and coalesce surface after intimate mixing and to adjust these respective means in a manner to secure efficient mixing and optimum yields.

It is well known in the art to treat mineral oils, particularly petroleum oils, with selective solvents in order to segregate the relatively more paraffinic fractions from the relatively more aromatic fractions. In these processes various solvents are used, as for example, solvents of the class which have a preferential selectivity for the more aromatic type compounds, as compared to the more paraffinic type compounds. Solvents of this class are, for instance, phenol, furfural, liquid sulfur dioxide, nitro benzene, cresol, aniline, beta beta dichlor diethyl ether and the like. Mixtures of these solvents are also used as well as solvent mixtures containing paraffinic hydrocarbons, as for example, liquefied normally gaseous hydrocarbons. It is also known to use substances which have the property to modify the selectivity and solvent power of the solvent, as for example, water, glycols, alcohols and the like which may be introduced at a single stage but are preferably introduced in a plurality of stages. In solvent treating processes optimum temperature and pressure conditions are employed which depend upon the particular solvent being used, the mineral oil being treated, and upon the quality and yield of products desired. In general atmospheric pressure is employed and the operation is conducted at a temperature between the solidification point of the particular solvent being used and the complete miscibility temperature of the oil and the solvent. The volume of solvent used per volume of oil also varies over a wide range, depending upon various factors, as for example, the solvent being used and the particular oil being treated. In general, approximately one volume to four volumes of solvent are employed per volume of oil being treated.

In these processes the oil and the solvent are contacted by various means, as for example, by a single-stage process or by a multi-stage process. However, for economical reasons, the most widely used process is the countercurrent solvent treating tower process. The heavier component, usually the solvent, is introduced at the top of the tower, while the lighter component, usually the oil, is introduced at the bottom of the tower. The oil and solvent flow countercurrently through the tower. In these processes various means have been employed in an effort to secure intimate phase contact in order to increase the capacity or the efficiency of the tower and to secure high quality yields. For example, various types of distributing trays or plates have been employed, as well as contact masses and the like. These methods have not been entirely successful due to the fact that the intimate mixing of the entire volumes of the respective phases is not secured, and also due to the fact that local areas of one phase form throughout the tower, resulting in a loss in tower efficiency or resulting in a decrease in the quality of yields secured.

The process of the present invention secures optimum countercurrent solvent treating operations by alternately mixing the respective phases in an efficient manner and then separating the respective phases completely in a minimum of time. In accordance with the present invention, the paths of the downflowing streams must necessarily cross the paths of the upflowing streams under conditions to form an emulsion and agitation zone. These intimately mixed phases are then conducted through settling zones or areas in which surfaces are provided upon which the two dispersed phases can coalesce and collect prior to the separation of the phases as they leave the zone in question.

The process of the present invention may be readily understood by reference to drawings #1 and #2, illustrating one modification of the invention. Figure 1 is a side view of a section of a countercurrent treating tower showing two plates. Figure 2 is the top view of the upper plate and Figure 3 is the top view of the lower plate.

In Figure 1, I represents a section of a countercurrent treating tower containing plates 2 and 20. Plate 2 contains screen-like upflow openings 3, 4 and 5, while plate 20 contains upflow openings 6, 7 and 8 respectively. Plate 2 likewise contains downflow pipes 9 and 10, while plate 20 contains downflow pipes 11 and 12. Downflow pipes 13 and 14 from the plate above plate 2 are also shown. Both plates 2 and 20 are divided into four zones by means of coalescing separating plates 15, 16 and 17.

According to the process of the present invention a portion of the downflowing heavier phase is fed onto plate 20 from plate 2 by means of downflow pipe 10. A portion of the upflowing lighter phase from the plate below plate 20 flows through the screen-opening 8 and in zone A intimately contacts and mixes with the downflowing heavier phase. The respective phases thus intimately mixed, move from zone A through vertical screen 15 containing horizontal plates. The lighter component after moving through screen 15 passes upwardly through screen-like opening 5 to plate 2, and the heavier component passes from plate 20 downwardly through pipe 12 to the plate below. According to the process of the present invention, the upflowing component or downflowing component must necessarily cross the line of flow of the other component, thus creating mixing and agitation zones. By this process of operation, on each plate there exists a number of parallel agitation zones A, A1 and A2 which are in series with settling and separation zones B, B1 and B2 respectively and separated from the same by means of coalescent screens or plates or similar means.

Figures 2 and 3 illustrate top views of plates 2 and 20 respectively.

Drawing 2, Figure 4, illustrates a further and preferred modification of the present invention. In this figure, 21 represents a section of a countercurrent solvent treating tower. 22 and 23 represent plates within said tower. Plate 23 contains chimneys 24 and 25, while plate 22 contains chimneys 26 and 27. Plate 23 contains recessed screen-like openings 28 and 29, while plate 22 contains recessed screen-like openings 30 and 31. Around recessed wells 28, 29, 30 and 31 are placed wire dispersing screens 32, 33, 34 and 35 respectively. Above the recessed wells are wire boxes 36, 37, 38 and 39 respectively which contain suitable coalescing surfaces. For example, in accordance with this modification of the process, a portion of the downflowing solvent settling upon plate 23 flows to well 29 having perforated walls. The solvent phase is then jetted through screen 33 into a stream of oil phase ascending through chimney 27 in the plate below. This results in an emulsion forming in the mixing zone which moves across plate 22, the lighter phase ascending through chimneys 24 and 25 and the heavier phase descending through recessed wells 30 and 31. A coalescent surface is provided by the wire boxes containing suitable material.

The process of the present invention may be varied widely. The type of construction of the coalescent and settling surfaces provided between the agitation and settling zones may be any suitable material, although particularly desirable settling and coalescent surfaces are a series of horizontal plates or wire containers containing loosely packed hollow ceramic cylinders. In order to further illustrate the invention, the following specific example is given which should not be construed as limiting the invention in any manner whatsoever.

*Example 1*

High quality yields may be secured by phenol treating a lubricating oil stock in the manner described in a tower in which the distance between the respective trays is two feet, which trays contain recessed reservoirs containing screen-like openings in the side walls of these reservoirs. The screen-like openings are formed by perforating sheet metal with holes ⅜" in diameter and on ¾" centers. The coalescing surfaces are provided by hollow ceramic cylinders ¾" in diameter by ¾" in length packed, either at random or with axes parallel to the direction of flow, in wire containers 10" in the vertical dimension, 8" in the dimension parallel to flow, and extending the length of the screen.

The process of the present invention is not to be limited by any mode or manner of operation, but only by the following claims in which it is desired to claim all novelty insofar as the prior art permits.

I claim:

1. A process for the segregation of petroleum oils into their relatively more aromatic and into their relatively more paraffinic constituents, comprising passing the oil to be treated upwardly through a tower containing a series of distributing plates and countercurrently intimately contacting the said oil with phenol under conditions adapted to produce agitation and coalescent zones between said plates alternately, said agitation zones being produced by causing the upflowing oil stream to be finely dispersed and intimately contacted with at least one downflowing phenol stream by causing the paths of the two streams to cross, passing the dispersed resultant mixture laterally through at least one coalescing zone, said zone containing relatively large surfaces known to induce coalescence, separating the extract phase from the raffinate phase, passing the raffinate phase upwardly to the next succeeding agitation contact zone and passing the extract phase downwardly to the next succeeding agitation contact zone, continuing the steps until the extraction has reached substantial equilibrium and withdrawing a final raffinate and a final extract from the tower.

2. A process as in claim 1 carried out continuously.

3. A process as in claim 1 carried out continuously and wherein a plurality of agitation and coalescing zones are maintained laterally with respect to zones of the same type, and vertically and alternately with respect to the series of said zones so arranged.

4. A process for the segregation of petroleum oils into their relatively more aromatic and into their relatively more paraffinic constituents, comprising passing the oil to be treated upwardly through a tower containing a series of distributing plates and countercurrently intimately contacting the said oil with a selective solvent for aromatic hydrocarbons under conditions adapted to produce agitation and coalescent zones between said plates alternately, said agitation zones being produced by causing the upflowing oil stream to be finely dispersed and intimately contacted with at least one downflowing stream of said aromatic hydrocarbon solvent by causing the paths of the two streams to cross, passing the dispersed resultant mixture laterally through at least one coalescing zone, said zone containing relatively large surfaces known to induce coalescence, separating the extract phase from the raffinate phase, passing the raffinate phase upwardly to the next succeeding agitation contact zone and passing the extract phase downwardly to the next succeeding agitation contact zone, continuing the steps until the extraction has reached substantial equilibrium and withdrawing a final raffinate and a final extract from the tower.

GEORGE T. ATKINS, Jr.